United States Patent [19]

Randol et al.

[11] 3,736,989
[45] June 5, 1973

[54] FLEXIBLE PLASTIC TRASH PLATE FOR A MOLDBOARD PLOW

[75] Inventors: Kent B. Randol, Naperville; Robert L. Redford, Westmont, both of Ill.

[73] Assignee: International Harvester Company, Chicago, Ill.

[22] Filed: Aug. 17, 1970

[21] Appl. No.: 64,624

Related U.S. Application Data

[63] Continuation of Ser. No. 443,029, March 26, 1965, abandoned.

[52] U.S. Cl. ................172/759, 172/612, 172/747
[51] Int. Cl. ............................................A01b 15/00
[58] Field of Search................172/189, 515, 519, 172/705, 706, 707, 612, 759, 736, 747; 152/352, 330, 323; 296/31 P, 31 R; 280/152, 154.5; 175/374, 84, 409, 410; 299/79

[56] References Cited

UNITED STATES PATENTS

| | | | |
|---|---|---|---|
| 447,521 | 3/1891 | Ball | 172/706 |
| 2,183,976 | 12/1939 | Smith | 172/747 |
| 2,348,997 | 5/1944 | Peacock | 172/612 |
| 2,572,276 | 10/1951 | Moe | 172/747 |
| 2,668,490 | 2/1954 | Oehler et al. | 172/519 |
| 2,940,773 | 6/1960 | Eaves | 280/154.5 |
| 2,953,211 | 9/1960 | Altgelt et al. | 172/736 |
| 3,126,969 | 3/1964 | Sewell | 172/719 |
| 3,207,234 | 9/1965 | Stewart | 172/519 |
| 680,846 | 8/1901 | Downen | 172/759 |
| 870,007 | 11/1907 | Amundson | 172/759 |
| 1,740,519 | 12/1929 | Miller | 172/759 |
| 2,624,258 | 1/1953 | Frevik | 172/747 |
| 2,913,060 | 11/1959 | Owen et al. | 172/747 |
| 2,950,771 | 8/1960 | Yetter | 172/759 |
| 3,029,879 | 4/1962 | Wells | 172/72 |
| 3,050,137 | 8/1962 | Rayder | 172/759 |
| 3,153,457 | 10/1964 | Van Der Lely | 172/756 |
| 3,347,188 | 10/1967 | Richey | 172/63 |

FOREIGN PATENTS OR APPLICATIONS

| | | | |
|---|---|---|---|
| 26,077 | 7/1923 | France | 172/717 |
| 8,002 | 7/1960 | Japan | 172/747 |
| 226,015 | 12/1959 | Australia | 172/759 |

*Primary Examiner*—Robert E. Pulfrey
*Assistant Examiner*—C. W. Hanor
*Attorney*—Floyd B. Harman

[57] ABSTRACT

A trash plate for securement to a moldboard plow having a smooth soil engaging surface and made from a flexible plastic material. The trash plate having sufficient rigidity to withstand the soil pressure thereagainst and sufficient flexibility under said pressure to inhibit the adherence of soil thereto.

5 Claims, 6 Drawing Figures

Patented June 5, 1973 3,736,989

Inventors
Kent B. Randol
Robert L. Redford
J K McNeil
Attorney

Patented June 5, 1973
3,736,989
2 Sheets-Sheet 2
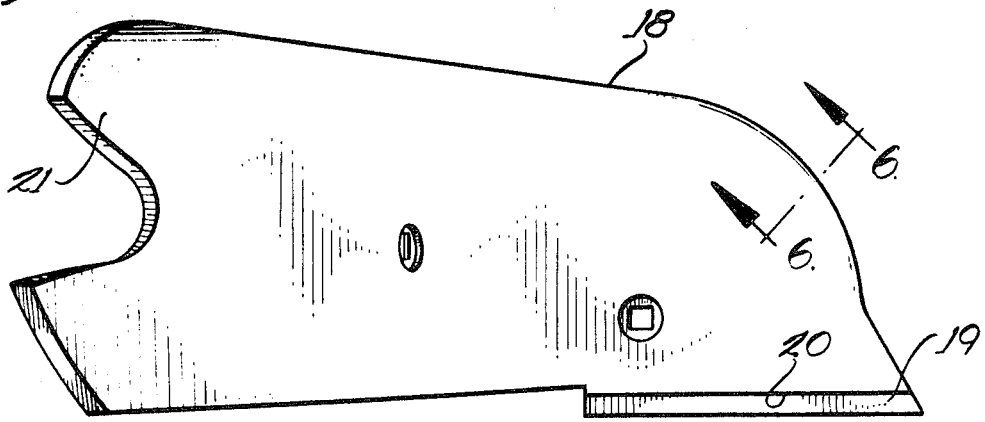
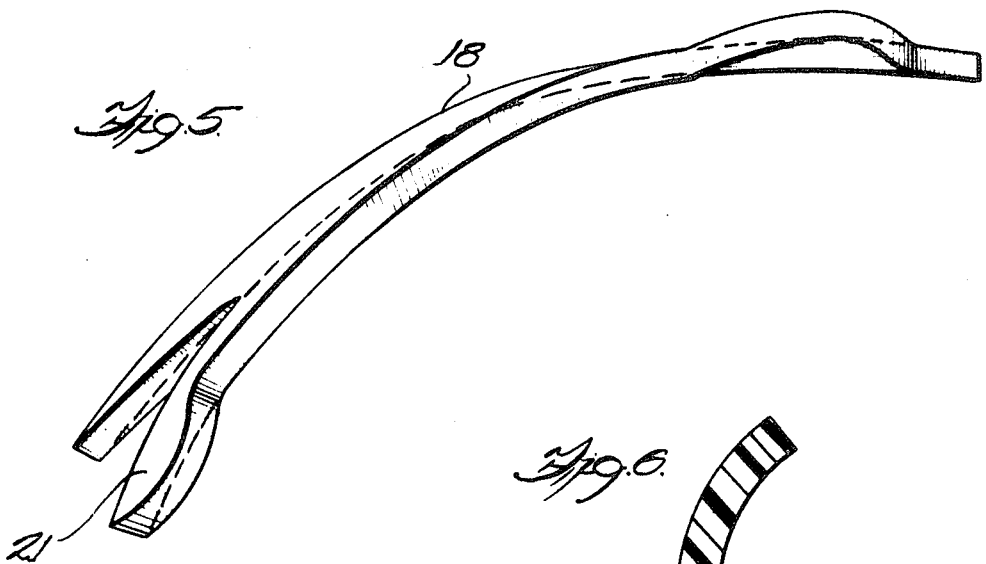

FLEXIBLE PLASTIC TRASH PLATE FOR A MOLDBOARD PLOW

This is a continuation of application, Ser. No. 443,029, filed March 26, 1965, now abandoned.

This invention relates to agricultural implements and particularly to plows. More specifically, the invention concerns an attachment for a moldboard plow to improve the capacity of the plow bottom to bury trash when the furrow is turned over.

Jointers and trash plate attachments for moldboard plows have been known and used for many years. They have been fashioned of rigid steel plate, and the disadvantages of previous devices of this type have resided in the high cost of replacement and low scouring properties.

An object of the present invention is to provide an economical and efficient trash plate attachment for moldboard plows wherein the soil-engaging face of the plate offers minimal frictional resistance to soil flow.

Another object of the invention is the provision of an improved trash plate attachment for a plow having inherent flexibility combined with a substantially frictionless soil-engaging face, providing maximum scouring properties.

Other objects and advantages of the invention will become clear from the following detailed description when read in conjunction with the accompanying drawings wherein:

FIG. 4 is an enlarged view in side elevation of the trash plate of this invention disconnected from the plow bottom;

FIG. 5 is a plan view of the plate shown in FIG. 4; and

FIG. 6 is a fragmentary section on the line 6—6 of FIG. 4.

Figure 1:
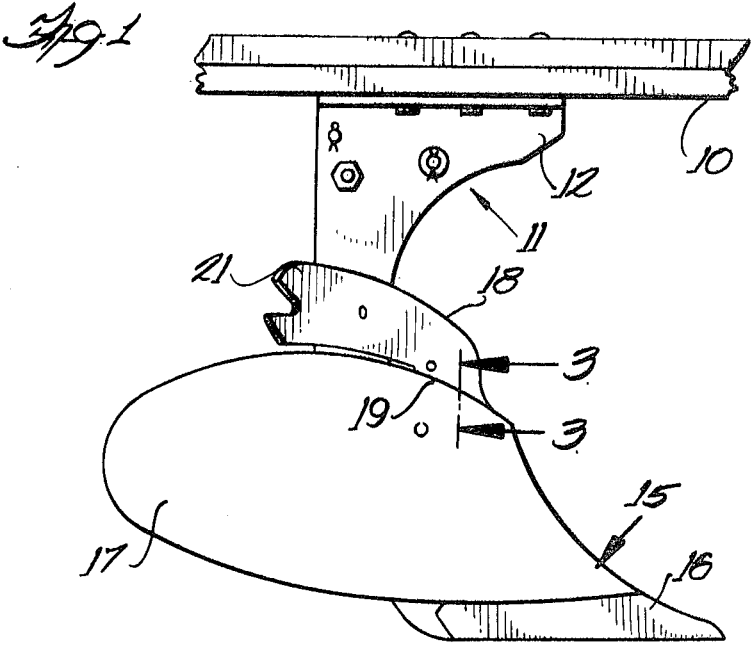
FIG. 1 is a view in side elevation of a trash plate according to this invention mounted on a moldboard plow.

FIG. 1 shows a portion of a plow frame 10 to which is secured a depending standard 11 comprising laterally spaced plates 12 having mounted therebetween a plow beam 13 of conventional construction having secured thereto a frog 14 on which the plow bottom 15 is mounted.

Plow bottom 15 includes a share 16 and a generally convex moldboard 17, the soil penetrated by the point of the share 16 flowing rearwardly and upwardly over the moldboard and being turned over due to the curvature thereof. The share and moldboard are made of steel and are relatively rigid. The terminology "moldboard type plow" as used in the specification and claims is intended to be interpreted as plows of the type having a landslide to receive the side pressure of the earth working element and to act as a runner, a point for making an initial cut in the earth, a share for making a substantially horizontal cut beneath the surface to cut a slice of earth and a moldboard to guide and completely invert the furrow slice or the functional equivalents thereof.

Figure 2:
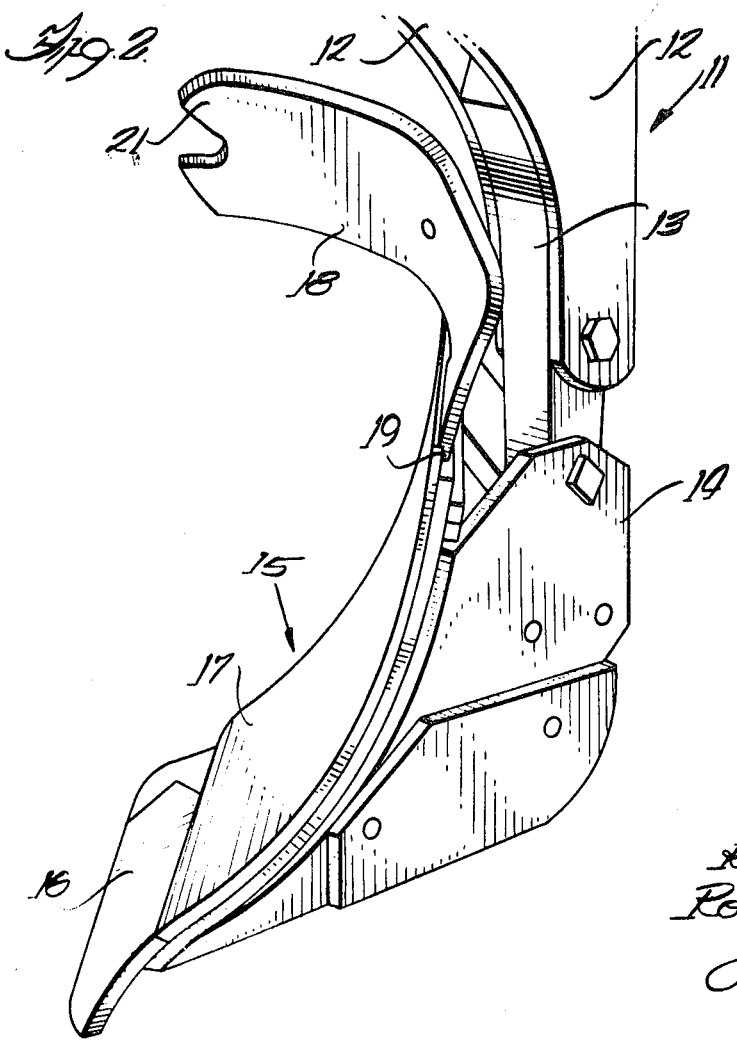
FIG. 2 is a perspective view from the front, on an enlarged scale, of a portion of the structure shown in FIG. 1.
Figure 3:
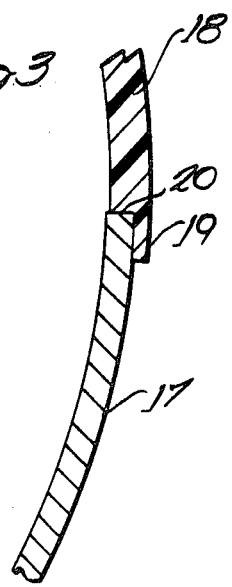
FIG. 3 is a fragmentary enlarged section taken on the line 3—3 of FIG. 1.

In trashy ground conditions and in plowing a cover crop, the plow bottom 15 turns the furrow satisfactorily, but auxiliary trash covering means is frequently required in order to adequately bury the trash or cover crop under the furrow. For this purpose Applicants have provided an attachment for a plow bottom in the form of a concavo-convex plate 18 having a forward depending or lower portion 19 which, as clearly shown in FIGS. 2 and 3, is recessed or offset from the main body of the plate to form a shoulder 20 which rests upon or lies adjacent the upper edge of moldboard 17, the depending portion 19 being disposed against the rear face of the rear edge of the upper portion of the moldboard. The trash plate 18 is secured to the tool beam 13 by any suitable means, not shown.

The trash plate 18 is bent outwardly across the upper edge of the moldboard and is directed furrowwardly, terminating in a bifurcated tail at the outer section of the plate as indicated in FIG. 5.

As will be clear from FIGS. 2 and 3, the trash plate 18 is preferably of greater thickness than moldboard 17, and is made of a relatively flexible plastic material, preferably a high density polyethylene synthetic material having a smooth and hard forward face adapted to engage dirt thrown upwardly and rearwardly by the moldboard 17 with a minimum of frictional resistance and to turn the trash over into the furrow. The inherent flexibility of the plate 18 permits it to yield sufficiently against the pressure of the soil to inhibit the adherence of soil thereto.

It is believed that the construction and operation of the novel moldboard plow attachment of this invention will be clearly understood from the foregoing description. It should likewise be understood that the invention has been described in its preferred embodiment and that modifications may be made therein without departing from the spirit of the invention or the scope of the appended claims.

What is claimed is:

1. A flexible trash plate attachment for fixed securement adjacent to the upper portion of the moldboard of a moldboard type plow that is adapted to be propelled through the soil, said attachment having a smooth soil engaging surface and formed of a flexible plastic material and of a shape, size and thickness such that it has sufficient rigidity so as to implement inversion of the earth worked by, the moldboard plow and is adapted to flex under the pressure of soil engagement to inhibit the tendency of soil to adhere thereto.

2. A trash plate for a moldboard type plow comprising:
   a. a plate formed of plastic material;
   b. means for fixedly mounting said plate juxtaposed to the moldboard of a moldboard type plow, at least partially in the path of earth worked by the tool;
   c. said plate having a curved soil engaging surface of a shape, size and thickness to provide sufficient rigidity so as to implement inversion of the earth worked by said moldboard type plow but permitting sufficient flexing in response to earth pressure so as to inhibit adherence of material thereto.

3. A trash plate formed of plastic material and fixedly mountable such that it is juxtaposed to the moldboard of a moldboard type plow at a location to positively engage the furrow slice as it emerges from the moldboard of the moldboard type plow, said trash plate functioning as a moldboard extension and having a face for slidably pressing against a furrow slice of soil formed by such bottom to implement inversion of such slice, said face of the trash plate being smooth and said plate having a shape, size and thickness to provide a character of rigidity so as to implement inversion of the earth worked and a character of flexibility making it susceptible to flexing in response to variation in the furrow slice pressure to a degree inhibiting adherence of soil to such face.

4. The combination with a moldboard type plow including a moldboard having a generally horizontal upper edge, a flexible trash plate attachment fixedly secured to the moldboard and formed of relatively thick plastic material, said trash plate having a smooth soil engaging surface, said flexible trash plate having a shape, size and thickness to provide sufficient rigidity so as to implement inversion of the earth worked but permitting sufficient flexing in response to earth pressure so as to inhibit adherence of material thereto, said trash plate having a lower portion of lesser thickness than the main body thereof extending downwardly from and rearwardly of said horizontal upper edge of the moldboard and forming with the upper portion of the flexible trash plate a shoulder adapted to engage said horizontal upper edge of the moldboard.

5. A trash plate as set forth in claim 4, wherein there is a concavo-convex portion to define a concave side of the plate and the smooth soil-pressing face is concave and incorporated into the concave side of the plate.

* * * * *